United States Patent [19]

Schulte

[11] Patent Number: 5,769,586
[45] Date of Patent: Jun. 23, 1998

[54] SELF-LOADING LOG TRANSPORTER

[76] Inventor: John Edward Schulte, R.R. #1 C. 70 Young Rd., 100 Mile House, British Columbia, Canada, V0K 2E0

[21] Appl. No.: 572,418

[22] Filed: Dec. 14, 1995

[51] Int. Cl.⁶ .................................................... B60P 3/41
[52] U.S. Cl. ...................... 414/23; 414/470; 414/501; 414/542
[58] Field of Search ............................. 414/23, 470, 475, 414/482, 486, 494, 496, 501, 542, 559, 560, 679; 212/281, 322, 329, 345

[56] References Cited

U.S. PATENT DOCUMENTS

| | | | |
|---|---|---|---|
| 2,773,606 | 12/1956 | Sheperd | 414/542 X |
| 2,959,421 | 11/1960 | Van der Lely et al. | 414/542 X |
| 3,090,510 | 5/1963 | Nodwell . | |
| 3,115,256 | 12/1963 | Sears . | |
| 3,424,326 | 1/1969 | Thatcher . | |
| 3,762,584 | 10/1973 | Peterson . | |
| 3,863,782 | 2/1975 | Sandrock | 414/542 |
| 3,978,990 | 9/1976 | Honea . | |
| 4,119,222 | 10/1978 | Kaarnametsä | 414/470 |
| 4,187,048 | 2/1980 | Bohlmann | 414/542 |
| 4,194,867 | 3/1980 | Bragg | 414/542 |
| 4,646,924 | 3/1987 | Dayson . | |
| 4,917,567 | 4/1990 | Renfro et al. . | |
| 4,984,961 | 1/1991 | Herolf | 414/559 X |

FOREIGN PATENT DOCUMENTS

| | | | |
|---|---|---|---|
| 4103993 | 8/1992 | Germany | 414/470 |
| 0086833 | 7/1981 | Japan | 414/470 |
| 0270258 | 11/1988 | Japan | 414/542 |
| 97013 | 9/1960 | Norway | 414/559 |
| 1418119 | 8/1988 | U.S.S.R. | 414/23 |
| 1463564 | 3/1989 | U.S.S.R. | 414/470 |

OTHER PUBLICATIONS

Patu III Loaders and Trailers Brochure.

*Primary Examiner*—James W. Keenan
*Attorney, Agent, or Firm*—Oyen Wiggs Green & Mutala

[57] ABSTRACT

A self-loading log transporter and a method for loading logs onto a log transporter are disclosed. The log transporter has a vehicle frame; a receiving deck on the vehicle frame for receiving logs between first and second walls; a rail extending generally parallel to and above the receiving deck; a carriage movable along the rail; a block mounted on the carriage; a winch on the vehicle frame; a cable on the winch having a free end extending through said block; a fastener on the free end of the cable for detachably affixing the free end of the cable to a log; and a drag system for resisting forward movement of the carriage along the rail. The rail has a portion extending rearwardly of a rearward end of the receiving deck.

24 Claims, 12 Drawing Sheets

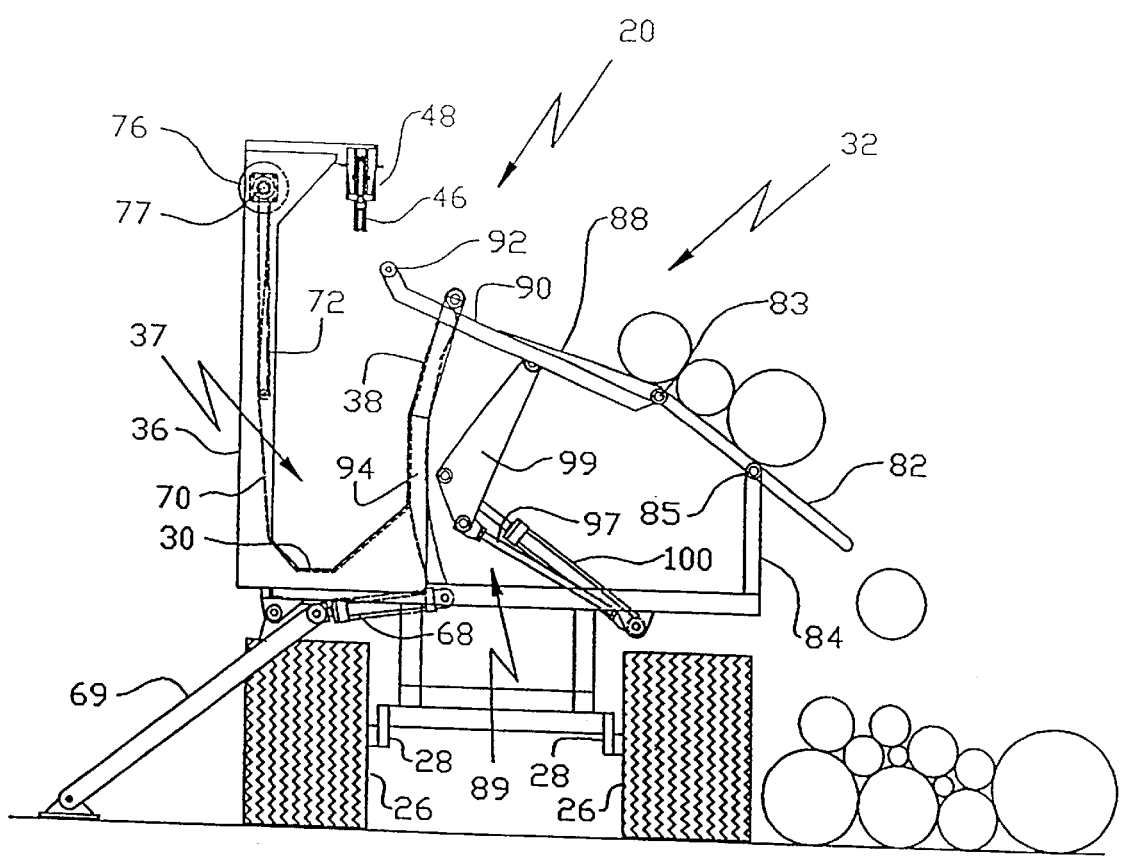

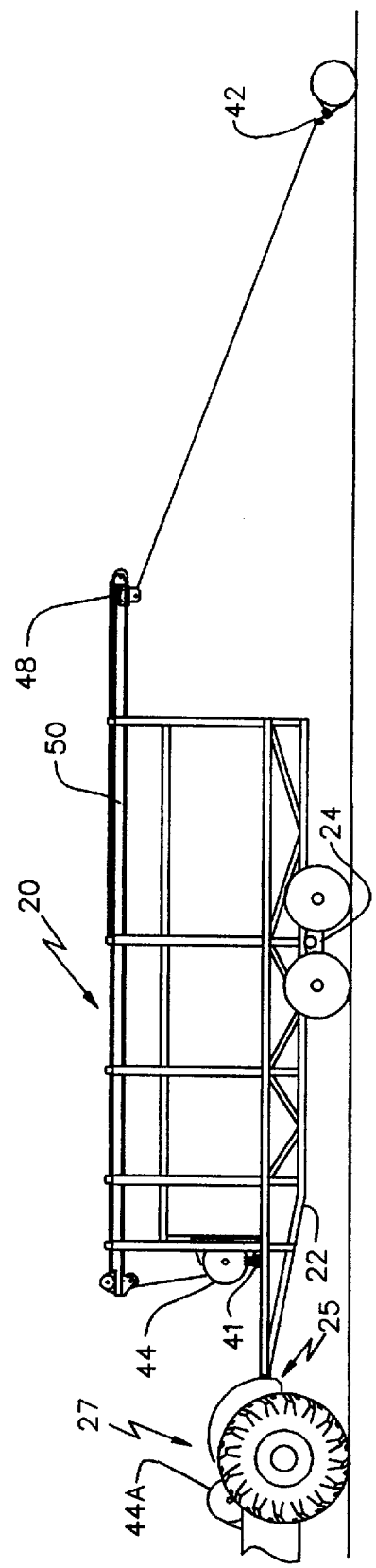

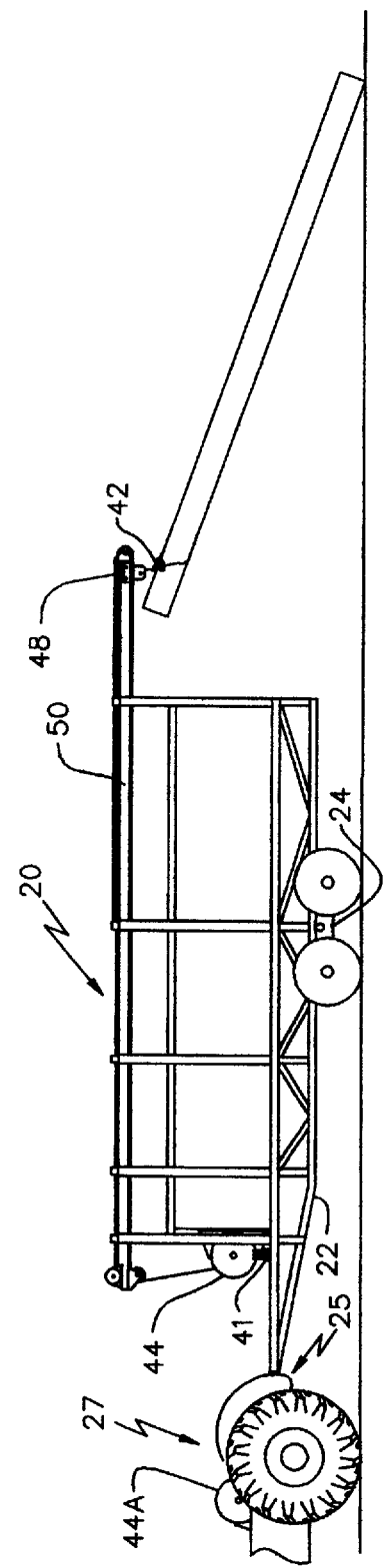

SELF-LOADING LOG TRANSPORTER

FIELD OF THE INVENTION

This invention relates to apparatus for drawing logs to a log transporter and loading the logs onto the log transporter and to a log transporter which includes such apparatus. The log transporter may be either a trailer or a self-propelled vehicle.

BACKGROUND OF THE INVENTION

In logging, trees are cut down and the tree limbs are cut off. The logs are then gathered and brought to a landing where they can be loaded onto a truck for transportation to a mill. Loggers use various methods to collect logs. The particular method used depends upon the terrain and the size of the logs being collected.

Where the terrain is not too steep it is common to use grapple skidders to collect logs. A grapple skidder is an off-road vehicle equipped with a grapple. The grapple is used to grab and lift one end of a log. The skidder then drags the logs to a landing along a skid trail. Grapple skidders have several disadvantages. The logs to be loaded cannot always be reached by a grapple skidder. Where the logs can be reached, skid trails must be fairly close together because a grapple skidder does not have a very long reach. Further, the skid trails can be heavily worn because logs are dragged along them. Thus skidder logging can cause unnecessary environmental damage. This problems are compounded because a skidder cannot drag very many logs at once. A skidder must make a separate trip for every few logs. Dragging logs for long distances with a skidder can also damage the logs.

In high-lead logging operations a tall spar pole is set up near the center of the area to be logged. Cut logs are winched into a landing adjacent the spar pole by means of cables suspended from the spar pole. A disadvantage of high-lead logging is that the spar pole is not always in a good place to reach all of the logs that need to be loaded. The spar pole cannot be easily moved to improve access to logs.

An alternative to a skidder is a log trailer. A trailer has the advantage that it can carry a relatively large number of logs. Some trailers, such as the PATU™ model 115HD available from Kesla OY of Joensuu Finland, are equipped with a loader, such as the PATU™ model 805A, for loading logs onto the trailer. A disadvantage of such trailers is that they can only load logs which are near the trailer. While a winch may be mounted on the loader for dragging logs up to the trailer this slows the loading process. The winch cannot easily drag logs up onto the trailer. Further, the log trailers known to the applicant are difficult to unload.

SUMMARY OF THE INVENTION

This invention provides a self-loading log transporter. The log transporter has a vehicle frame; a receiving deck on the vehicle frame for receiving logs between first and second walls; a rail extending generally parallel to and above the receiving deck; a carriage movable along the rail; a block mounted on the carriage; a winch on the vehicle frame; a cable on the winch having a free end extending through said block; means on the free end of the cable for detachably affixing the free end of the cable to a log; and drag means for resisting forward movement of the carriage along the rail. The rail has a portion extending rearwardly of a rearward end of the receiving deck.

In a preferred embodiment, the log transporter comprises a second deck extending between the second wall and a wall and transfer means for transferring logs from the receiving deck to the second deck. The transfer means preferably comprises a plurality of flexible members. The flexible members are suspended between a top portion of the second wall and points on the first wall above the top portion of the second wall. The transfer means includes means for tensioning the flexible members to lift logs off of the receiving deck and roll the logs over the top of the second wall. The flexible members preferably comprise sections of leaf chain.

A second aspect of the invention provides a method for loading logs onto a receiving deck in a log transporter. The method includes the steps of: providing a winch equipped with a cable at a forward end of the receiving deck; extending the cable through a block mounted to a carriage which is movable longitudinally above the receiving deck; moving the carriage to a point behind a rear edge of the receiving deck and attaching a free end of the cable to a log to be loaded; applying drag to the carriage to resist forward motion of the carriage; operating the winch to draw the log toward the receiving deck and to lift a first end of the log toward the block; and when the first end of the log is higher than the receiving deck, allowing the winch to pull the carriage forwardly against the resistance while dragging the log onto the receiving deck.

BRIEF DESCRIPTION OF THE DRAWINGS

Embodiments of the invention will now be described with reference to the accompanying drawings in which:

FIGS. 5A, 5B, and 5C are a series of views showing the sequence of operations in loading and dumping the log transporter of FIG. 1;

FIGS. 7A, 7B and 7C are a series of schematic side elevational drawings illustrating the sequence of steps in loading a log onto the log transporter of the invention.

DETAILED DESCRIPTION OF PREFERRED EMBODIMENTS OF THE INVENTION

Figure 1:
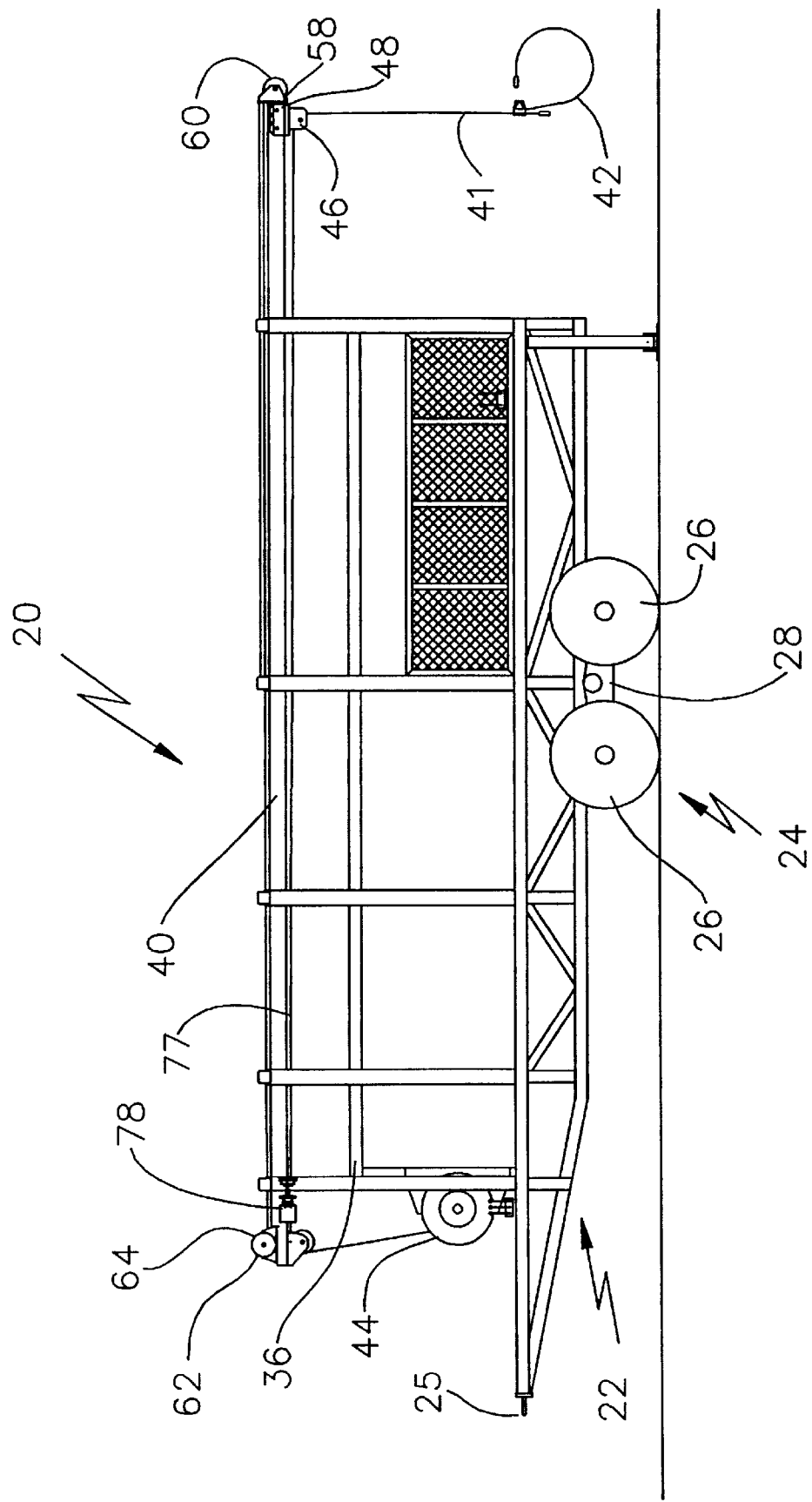
FIG. 1 is a left side elevational view of a log transporter according to the invention.
Figure 2:
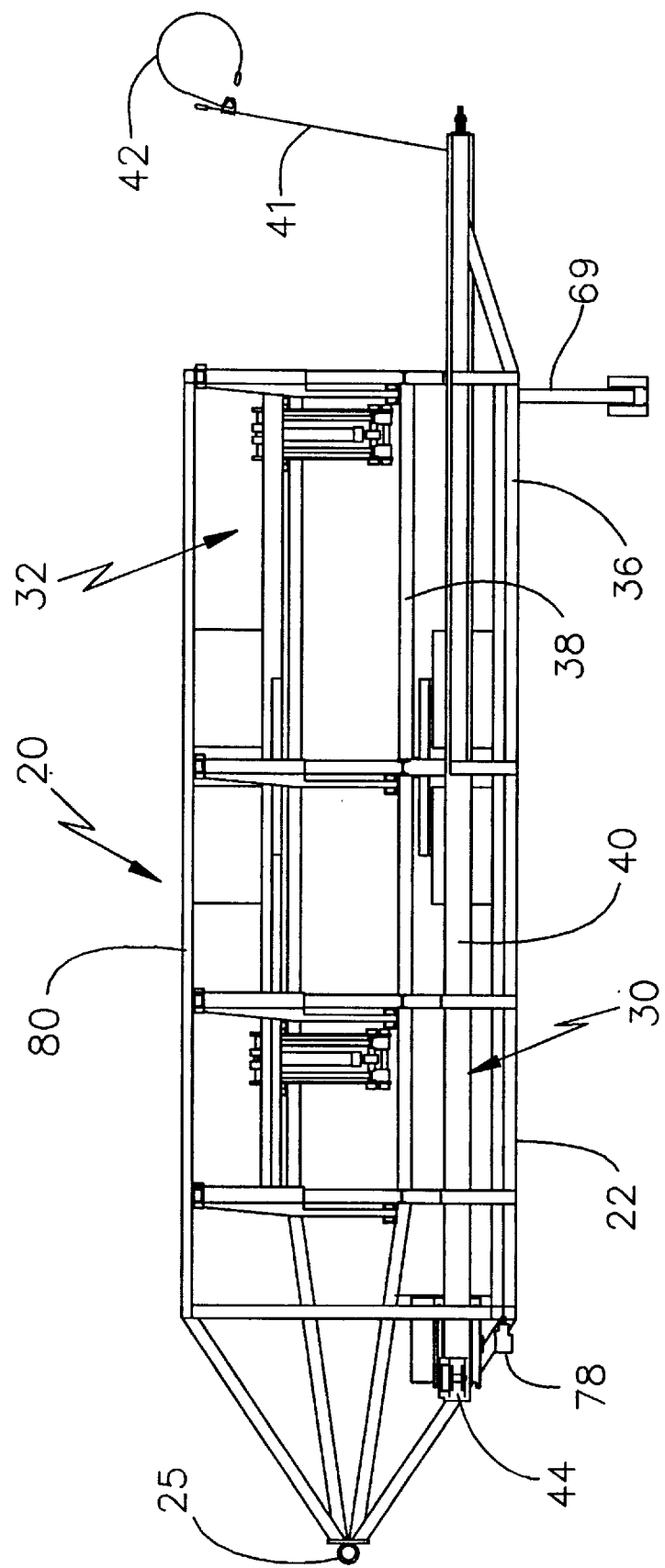
FIG. 2 is a top plan view thereof.
Figure 3:
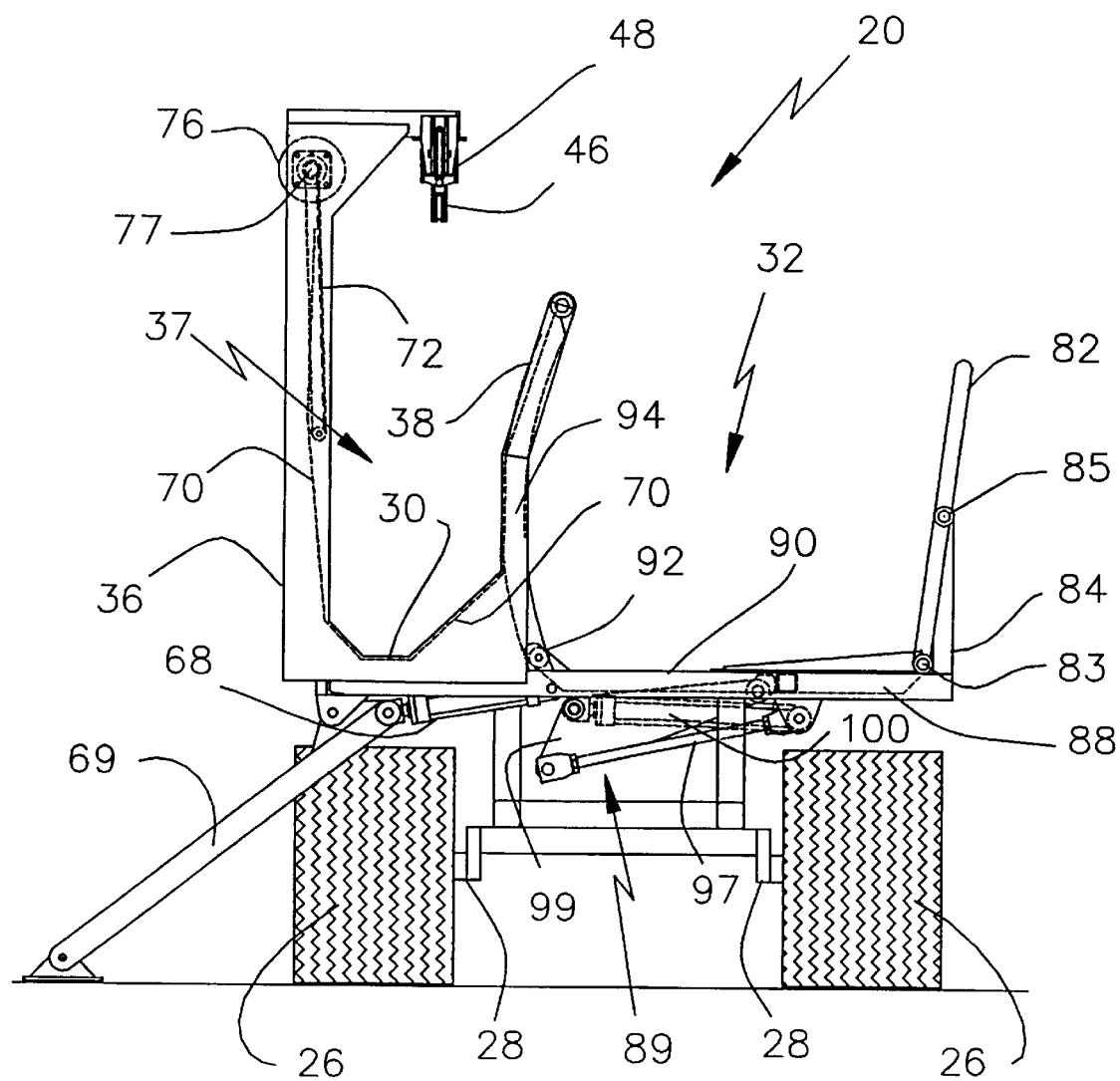
FIG. 3 is a rear elevational view thereof.
Figure 4:
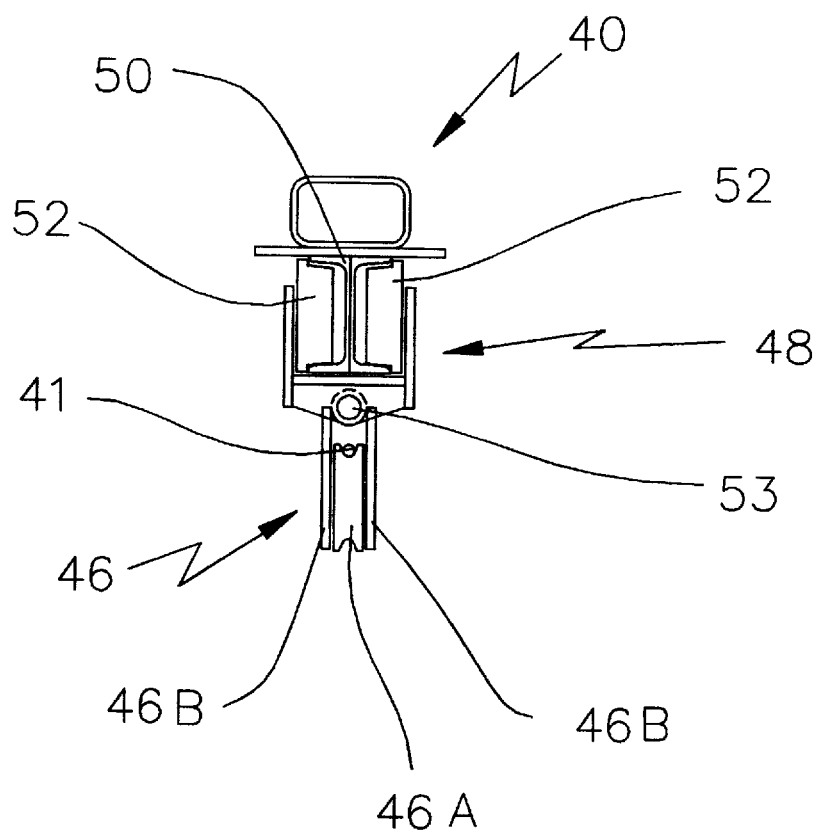
FIG. 4 is a section through the rail portion of the loading mechanism thereof.

As shown in FIG. 1, a log transporter 20 according to the invention comprises a vehicle frame 22 which is equipped with running gear 24. In the Figures, running gear 24 comprises a walking beam suspension in which wheels 26 are mounted on either end of a walking beam 28, which is pivotally attached to frame 22. Preferably running gear 24 can be moved longitudinally on frame 22 to adjust the distribution of weight between running gear 24 and hitch 25. While a walking beam suspension is generally preferred because of its ability to travel well over rough ground, other known types of suspension may also be used. Running gear 24 may also comprise a pair of tracks (not shown) in place of wheels 26. Tracks are preferable for travel over soft or boggy ground. Log transporter 20 may be a trailer, as shown, with a hitch 25 for connection to a separate towing vehicle 27 (see FIG. 7A), or may be a self-propelled vehicle.

Log transporter 20 has a receiving deck 30 extending along one side of frame 22 adjacent to a dumping deck 32.

Walls 36, 38 extend along either side of receiving deck 30 to form a trough-like area 37 capable of holding several logs. The floor of receiving deck 30 preferably comprises several spaced apart transverse members 39. This permits dirt and wood debris to fall through the bottom of receiving deck 30 onto the ground. Dumping deck 32 is larger than receiving deck 30 and can hold more logs. Walls 36, 38 need not be continuous but may be formed of spaced apart stakes. This both improves access to logs on receiving deck 30 and prevents log transporter 20 from blocking the vision of the driver of a vehicle pulling log transporter 20. A rail 40 extends along the length of receiving deck 30 above receiving deck 30. Rail 40 is preferably about 6 feet or more above receiving deck 30. Rail 40 extends rearwardly of receiving deck 30, preferably by 6 feet or more.

As is more fully described below, an operator can load log transporter 20 by attaching one or more logs to the end of a cable 41 with a suitable log gripping device, for example, a chain or a choker 42 and winching the log or logs onto receiving deck 30 with cable 41. Receiving deck 30 provides the operator easy access to choker 42 so that choker 42 can be quickly and easily removed from the logs. Receiving deck 30 is equipped with means for transferring logs onto to dumping deck 32. The operator loads logs onto receiving deck 30, removes choker 42 and transfers the logs onto dumping deck 32 until dumping deck 32 is full. The operator may then load a last bundle of one or more logs onto receiving deck 30. When log transporter 20 is full it can be driven to a landing and unloaded by operating dumping deck 32 to dump logs over the edge of log transporter 20. Log transporter 20 can retrieve logs which are not right next to log transporter 20.

Loading System

Cable 41 extends from a main winch 44 and through a block 46. Block 46 is mounted to a carriage 48 which is, in turn, slidably mounted to rail 40. While main winch 44 is shown as a separate winch mounted on the frame of log transporter 20, main winch 44 may also be a winch 44A (see FIG. 7A) on a vehicle, such as a skidder, towing log transporter 20. In this case the main winch 44 is coupled to the frame of log transporter 20 indirectly by means of hitch 25. Preferably, rail 40 comprises an I-beam 50, which may be suitably reinforced, and carriage 48 is mounted to I-beam 50 with two pairs of rollers 52. Each pair of rollers 52 engages the lower flange on one side of I-beam 50. Block 46 is preferably pivotally mounted to carriage 48 by a pin 53 so that block 46 can swing to either side if logs being retrieved are not in line with rail 40. Block 46 preferably comprises a pulley 46A mounted between plates 46B which project rearwardly to prevent choker 42 from being pulled into contact with pulley 46A when cable 41 is retracted.

It can be appreciated that there are many variations of rail 40 and carriage 48 which come within the broad scope of the invention. What is required is that block 46 be mounted so that it can slide along rail 40.

Driving means are provided to move carriage 48 along to the rear end of rail 40. The driving means may optionally be also capable of pulling carriage forwardly on rail 40. In the Figures, the driving means comprises a cable 58 which extends from a carriage winch 62, around a pulley 60 at the rear end of rail 40, to the rear end of carriage 48. Carriage winch 62 is driven by a motor, preferably a hydraulic motor 64. It can be readily appreciated that carriage 48 may pulled toward the rear end of rail 40 reeling in cable 58 with carriage winch 62. Limit switches may be provided to prevent an operator from attempting to move carriage 48 past either end of rail 40.

Figure 8:
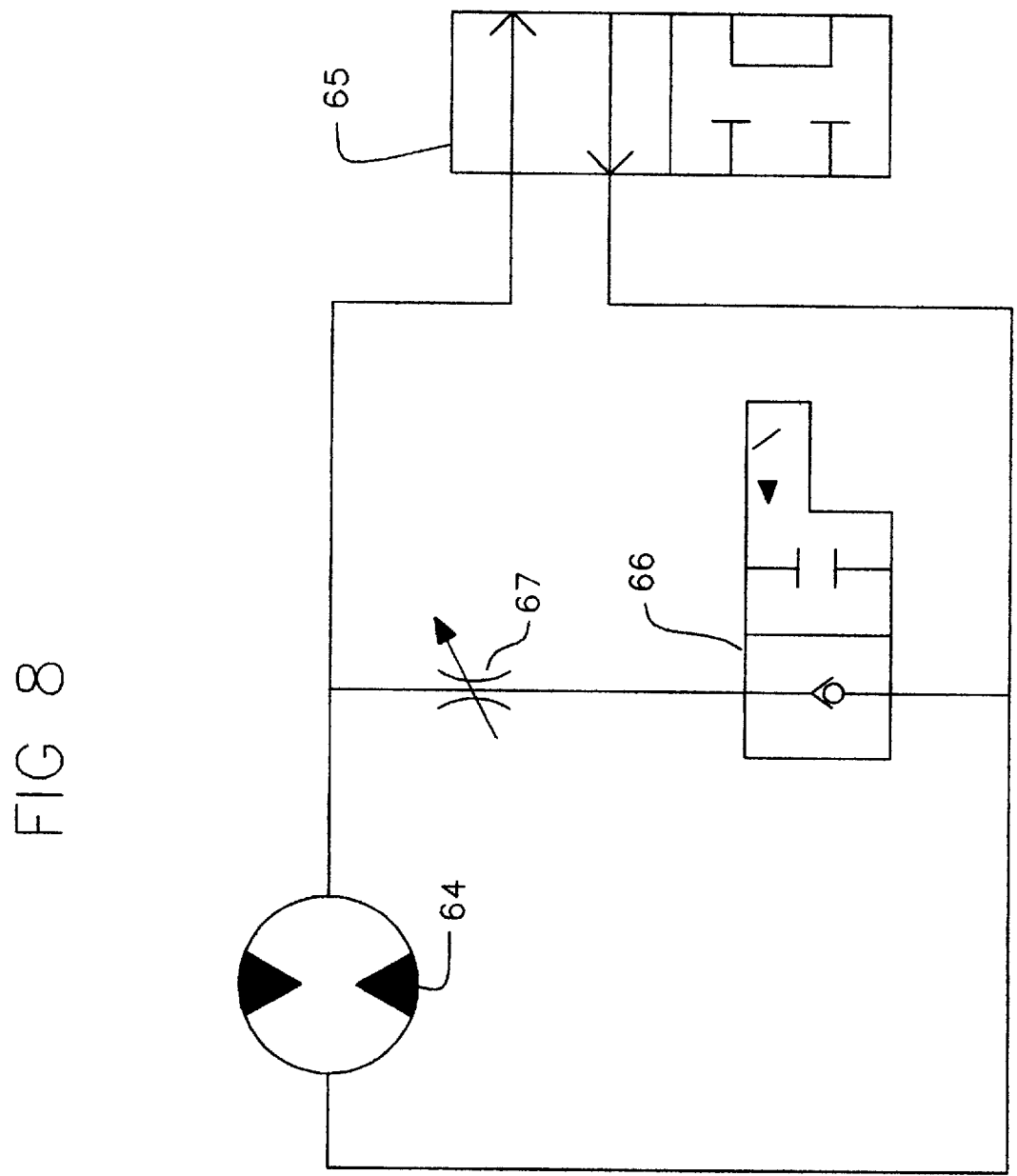
FIG. 8 is a schematic diagram of a hydraulic drag means for use in the invention.

Drag means are provided for braking the forward motion of carriage 48 along rail 40. Preferably the drag means is integrated with motor 64. The drag means should not completely lock carriage 48 in place. When the drag means is applied, it should be possible to pull carriage 48 forward along rail 40 as long as the force on carriage 48 exceeds a threshold value. The threshold value should typically be in the range of 800 pounds to 1200 pounds. Where the driving means comprises a hydraulic motor 64 then, as shown in FIG. 8 the drag means may comprise a valve 65 for shutting off the flow of hydraulic fluid to hydraulic motor 64 and a bypass valve 66 which extends between the fluid input and output of hydraulic motor 64 (FIG. 8). Bypass valve 66 is preferably electrically operated. A flow control 67, such as a model EFM 12355 flow control valve available from Deltrol Fluid Products of Beltwood, Ill., is preferably in series with bypass valve 66. In the alternative, the drag means may comprise a frictional brake, such as a disc or drum brake This is not preferred because frictional brakes add complexity and are subject to wear.

Figure 7C:
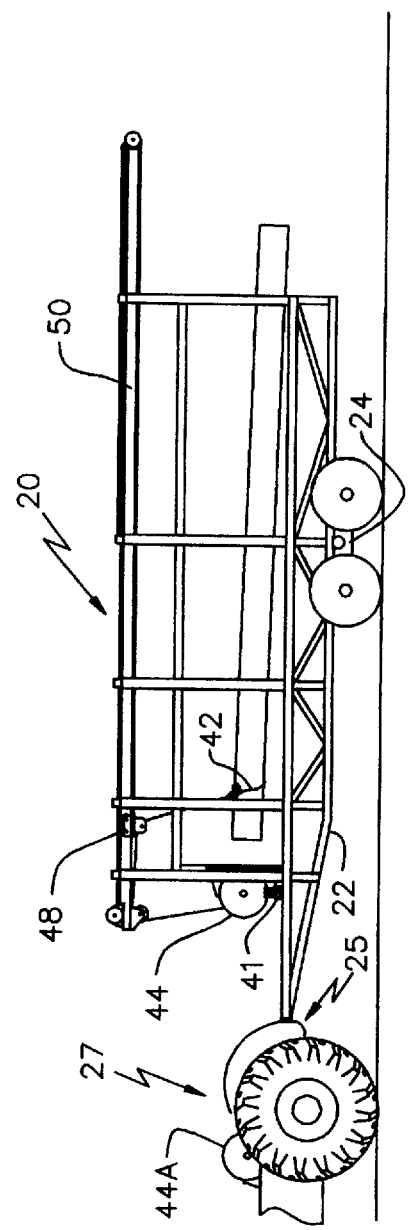

FIGS. 7A through 7C show the series of steps for loading logs onto receiving deck 30. Initially the operator moves carriage 48 to the rear end of rail 40 and sets the drag means to prevent carriage 48 from moving. The operator then unreels a length of cable 41 from the drum of main winch 44 and attaches choker 42 (or a suitable alternative log-gripping device) to the one or more logs to be loaded. Several chokers 42 may be attached at the end of cable 41 for simultaneously bringing in several logs. Next, the operator activates main winch 44 to reel in the log. Cable 41 is typically on the order of 50 meters to 150 meters long to allow logs to be pulled in from a significant distance from log transporter 20. This, in turn allows skid tracks to be more widely separated than they would need to be for a conventional log skidder.

When a log reaches log transporter 20 (as shown in FIG. 7B) cable 41 pulls the end of the log upwardly toward block 46. As the log nears block 46 the component of force exerted on block 46 along rail 40 becomes larger. When this component of force becomes large enough to overcome the resistance provided by drag means 64, 65, 67 then carriage 48 travels forwardly along rail 40. The drag means preferably provides enough resistance to hold carriage 48 at the rearward end of rail 40 until cable 41 has lifted the end of the log being loaded well above the level of receiving deck 30 and has pulled choker 42 up against block 46. As main winch 44 continues to pull on cable 41 carriage 48 and the log are pulled together toward the forward end of receiving deck 30.

When the log has been pulled almost to the end of receiving deck 30 the operator briefly reverses main winch 44 to loosen cable 41. The operator can then remove choker 42. Preferably the operator has placed the log so that choker 42 is between two transverse members 39 of receiving deck 30. If choker 42 is stuck under a log then the operator can pull the unfastened choker 42 free by pulling carriage 48 rearwardly with carriage winch 59. Receiving deck 30 is preferably about two to four feet high so that it is easy for the operator to reach and remove choker 42. After choker 42 has been unfastened then carriage 48 can be driven to the rear end of rail 40 with motor 64 and main winch 44 may be placed in a free-spinning mode to allow the operator or a chokerman to pull out cable 41 so that choker 42 may be set on another log.

One or more legs 69 may be provided to stabilize log transporter 20 while logs are being winched in and during unloading. Legs 69 are pivotally mounted to frame 22 and are preferably lowered by a hydraulic cylinder 68.

Log Transfer System

Receiving deck 30 has a limited capacity. Further, if new logs are brought onto receiving deck 30 on top of previously loaded logs then the previously loaded logs may obstruct the operator from removing choker 42 from the new logs. The operator may need to pull choker (or chokers) 42 free by using carriage winch 59 as described above. Preferably one set of controls for the hydraulic systems on log transporter 20 are located adjacent receiving deck 30 so that the operator can easily free choker(s) 42 if it becomes stuck under a log.

A transfer means is provided for transferring logs from receiving deck 30 to dumping deck 32. Preferably the transfer means comprises a plurality of spaced apart flexible members 70 which can be drawn upwardly from underneath logs on receiving deck 30 to dump the logs over wall 38 onto dumping deck 32. Flexible members 70 are preferably robust and shaped so that they do not unnecessarily dig into and scar logs. Flexible members 70 are preferably chains, and are most preferably leaf chains.

In the exemplary embodiment shown in the Figures, flexible members 70 comprise lengths of leaf chain. Each flexible member 70 has one end attached to a drum 76 on a shaft 77 driven by a motor 78. Drums 76 are located high on wall 36. The other end of each of flexible members passes over top of wall 38 where it is attached. Flexible members 70 can be tensioned by turning shaft 77. As shaft 77 turns, flexible members 70 wrap around drums 76 until they extend upwardly at an angle from the top of wall 38 to drums 76. As flexible members 70 are tightened they lift the logs on receiving deck 30 until the logs roll overtop of wall 38 onto dumping deck 32. Alternative tensioning means may be provided for tensioning flexible members 70. For example, flexible members 70 may be tensioned by engagement with a turning sprocket or wheel, one end of flexible members 70 may be connected to a linear actuator, such as a hydraulic cylinder etc. Preferably flexible members 70 have individual length adjustment means (not shown) so that flexible members 70 can be adjusted to evenly bear the weight of logs being lifted from receiving deck 30.

Preferably an arm 72 is pivotally mounted to frame 22 on wall 36 adjacent each of drums 76. When flexible members 70 are loose then arms 72 hang vertically between the stakes of wall 36. Arms 72 preferably each comprise a pair of members pivotally attached to wall 36 at their upper ends and connected by a crosspiece 74 at their lower ends. Flexible members 70 extend between crosspieces 74 and wall 36.

When flexible members 70 are loose then they hang vertically between the stakes of wall 36. The lowermost portions of the loose flexible members 70 hang between transverse members 39 of receiving deck 30 below the level of the surface of receiving deck 30, and extend up to the top of wall 38. The upper edges of transverse members 39 may curve upwardly to protect flexible members 70. Flexible members 70 are preferably mounted to wall 38 so that, when flexible members 70 are loose, the flexible members 70 lie between the stakes of wall 38. When flexible members 70 are loose neither flexible members 70 nor arms 72 project into the trough like area 37 between walls 36 and 38 above receiving deck 30.

Figure 5A:
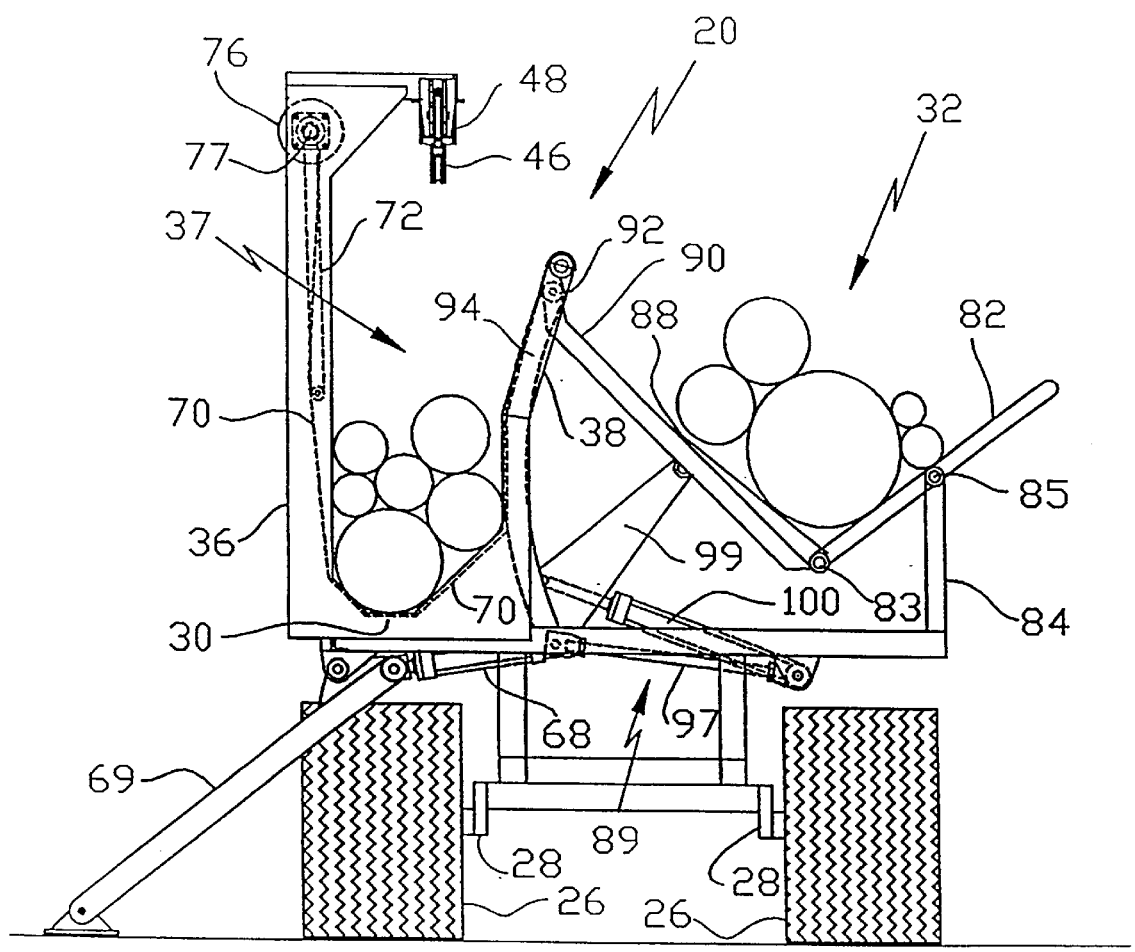

As shown in FIG. 5A, flexible members 70 are loosened before logs are loaded onto receiving deck 30. After the logs have been loaded, flexible members 70 extend under the loaded logs in sling-like fashion. The logs are transferred to dumping deck 32 by tensioning flexible members 70. In the embodiment shown in the figures, this is done by turning shaft 77 by means of motor 78. As shaft 77 turns, flexible members 70 wind onto drums 76. As flexible members 70 are tightened they draw up underneath logs on receiving deck 30 and lift the logs upwardly toward the top of wall 38. The logs roll over the top of wall 38 onto dumping deck 32 when flexible members 70 are sufficiently tight. As flexible members 70 are tightened they slide along and push against crosspieces 74 of arms 72 so that arms 72 pivot toward the top of wall 38 and help to urge logs onto dumping deck 32.

Log Dumping System

Dumping deck 32 holds logs that are loaded onto log transporter 20. When log transporter 20 has a full load then a dumping mechanism in dumping deck 32 can be activated to dump the accumulated logs onto a pile beside log transporter 20. Dumping deck 32 lies between wall 38 and an outer wall 80 of log transporter 20. Many known varieties of dumping deck may be used with the invention. A preferred construction of dumping deck 32 is described below.

Preferably, outer wall 80 comprises a number of stakes 82 which are pivotally mounted to upwardly projecting posts 84 at pivots 85. The dumping mechanism comprises a deck member 88 which has one side pivotally connected to the bottom ends of stakes 82 at pivots 83. The other side of deck member 88 has a number of projections 90. Rollers 92 at the ends of projections 90 slide in tracks 94 in wall 38.

Figure 5B:
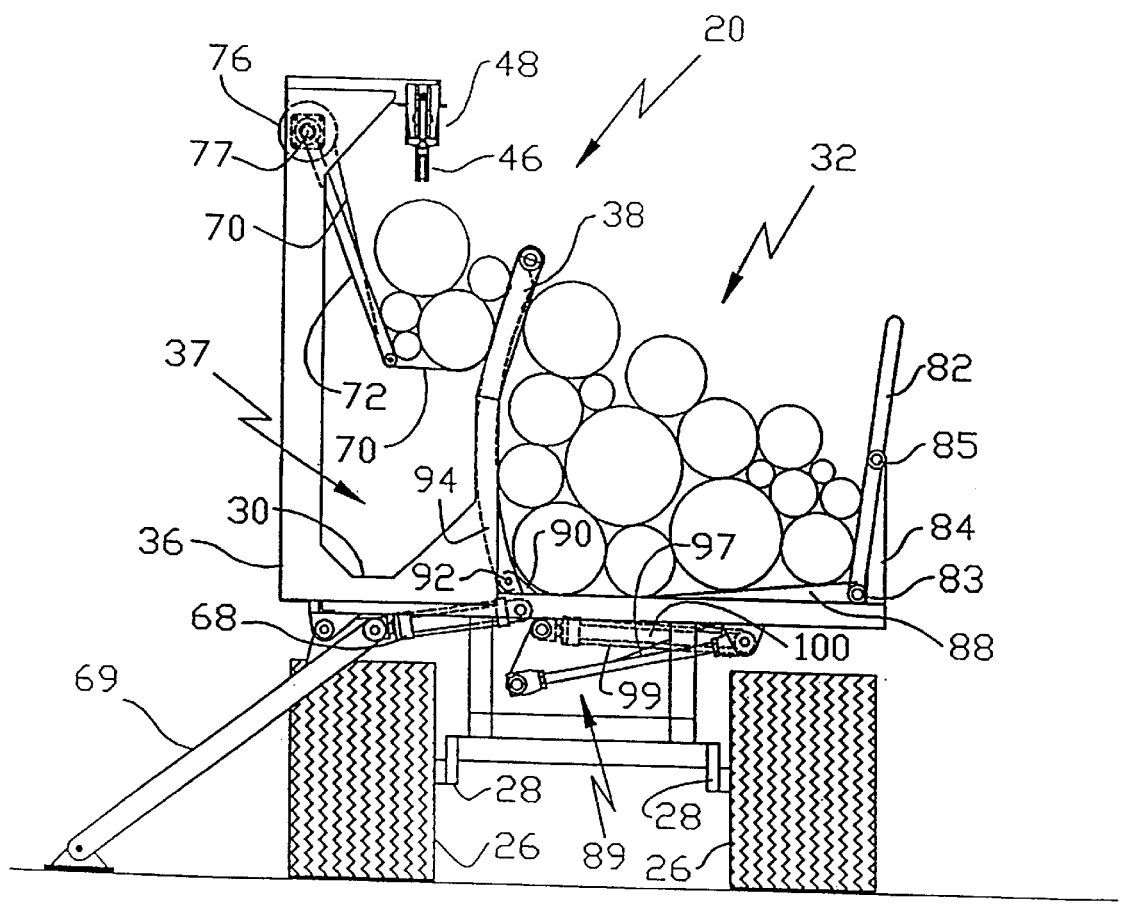
Figure 6B:
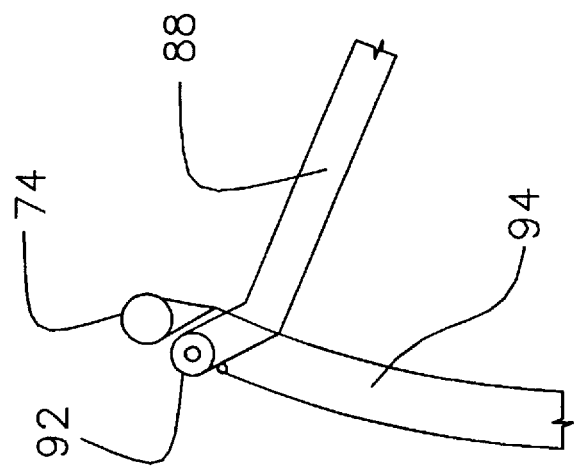
FIG. 6A and 6B are schematic details showing the operation of the mechanism for unloading the dumping deck thereof.
Figure 6A:
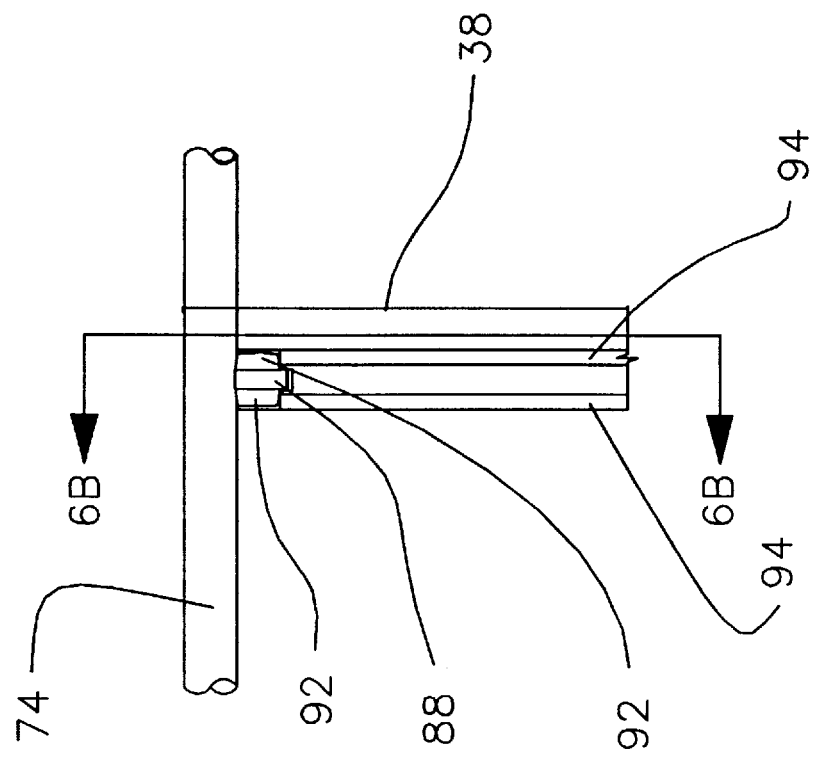

Deck member 88 can be raised to dump logs from dumping deck 32 by means of a lift 89. As shown in FIG. 5B, when deck member 88 is fully lowered, stakes 82 are generally vertical and perpendicular to deck member 88. As deck member 88 is raised, rollers 92 roll upwardly in tracks 94. While rollers 92 are in tracks 94 deck member 88 and stakes 82 remain in a generally "L" shaped configuration and are generally perpendicular to each other.

It can be useful to place deck member 88 in a partially lifted position for loading the first logs from receiving deck 30 to dumping deck 32. The vee-shaped bottom of the partially raised deck member 88 helps to align logs on dumping deck 32. Because deck member 88 is partially lifted logs do not fall too far before hitting deck member 88. After a few logs have been loaded onto deck member 88 then deck member 88 can be fully lowered and dumping deck 32 can be filled to capacity.

During dumping, when rollers 92 reach the tops of tracks 94 then deck member 88 and stakes 82 are no longer constrained to remain in a generally "L" shaped configuration. As deck member 88 is raised further stakes 82 pivot outwardly at pivots 83 to dump any logs that are on deck member 88. Preferably pivots 85 are at least six feet above the ground so that logs may be dumped onto piles five feet or more high.

Lift 89 may be any practical mechanism capable of lifting deck member 88 while allowing deck member 88 to move as described above. Lift 89 preferably comprises a pair of pivotally connected first and second lift members 97, 99 connected between frame 22 and deck member 88 and a hydraulic cylinder 100 connected between first and second lift members 97, 99 for spreading first and second lift members 97, 99 apart.

All of the systems on log transporter 20 may be hydraulically driven. An engine-driven hydraulic pump (not shown) may be mounted on log transporter 20 to provide hydraulic power or hydraulic power may be provided by a vehicle towing log transporter 20. Preferably the hydraulic functions are controlled electrically so that duplicate controls may easily be located in more than one place on log transporter 20 and/or on a vehicle towing log transporter 20.

The controls preferably include a control to place main winch 44 in one of three modes, power in, brake and free spool. The control system for main winch 44 preferably includes an inclination sensor mounted to frame 22 to prevent main winch 44 from being powered if frame 22 is tipped past a safe inclination and a limit switch to prevent main winch 44 from pulling carriage 48 past the front of rail 40. Another control is provided for carriage winch 59. This control preferably allows carriage winch 59 to be shifted between a power in state in which carriage 48 is drawn toward the rear end of rail 40 and a neutral state in which carriage winch 59 resists the forward movement of carriage 48 as described above. Preferably the control for carriage winch 59 automatically shuts off power to carriage winch 59 when carriage 48 nears the rear end of rail 40. Another control is provided for motor 78 which operates the log transfer means. Preferably this control allows flexible members 70 to be tightened or loosened under power. Preferably the control system for motor 78 automatically shuts down motor 78 when flexible members are either fully loosened or fully tightened. A further control is provided for raising and lowering leg 69.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A log transporter comprising:
   (a) a vehicle frame;
   (b) a receiving deck on said vehicle frame for receiving logs between first and second walls;
   (c) a rail extending generally parallel to and higher than said receiving deck, said rail having a portion extending rearwardly of a rearward end of said receiving deck;
   (d) a carriage movable along said rail;
   (e) a block mounted on said carriage;
   (f) a winch coupled to said vehicle frame;
   (g) a first cable on said winch, said cable having a free end extending through said block;
   (h) means on said free end of said cable for detachably affixing said free end of said cable to a log; and
   (i) drag means for resisting forward movement of said carriage along said rail;
   the drag means having an applied state and a non-applied state wherein, when said drag means is in said applied state, said drag means prevents forward movement of said carriage along said rail unless a forwardly directed force in excess of a threshold force is applied to said carriage and said drag means permits forward motion of said carriage along said rail if a forwardly directed force in excess of said threshold force is applied to said carriage and, when said drag means is in said non-applied state, said drag means permits forward motion of said carriage along said rail when a forwardly directed force smaller than said threshold force is applied to said carriage.

2. The log transporter of claim 1 wherein said drag means comprises a second cable extending rearwardly from said carriage and connected to a carriage winch.

3. The log transporter of claim 1 wherein said drag means comprises a frictional brake.

4. The log transporter of claim 1 wherein said threshold force is approximately 800 pounds or more.

5. A log transporter comprising:
   (a) a vehicle frame:
   (b) a receiving deck on said vehicle frame for receiving logs between first and second walls:
   (c) a rail extending generally parallel to and higher than said receiving deck, said rail having a portion extending rearwardly of a rearward end of said receiving deck;
   (d) a carriage movable along said rail;
   (e) a block mounted on said carriage;
   (f) a winch coupled to said vehicle frame;
   (g) a cable on said winch, said cable having a free end extending through said block;
   (h) means on said free end of said cable for detachably affixing said free end of said cable to a log; and
   (i) drag means for resisting forward movement of said carriage along said rail;
   (j) a second deck extending between said second wall and a third wall; and
   (k) transfer means for transferring logs from said receiving deck to said second deck.

6. The log transporter of claim 5 wherein said transfer means comprises a plurality of flexible members, said flexible members suspended between a top portion of said second wall and points on said first wall above said top portion of said second wall, and means for tensioning said flexible members, whereby tensioning said flexible members lifts said logs off of said receiving deck and rolls said logs over said top portion of said second wall.

7. The log transporter of claim 6 wherein said flexible members comprise sections of chain.

8. The log transporter of claim 7 wherein said flexible members comprise sections of leaf chain.

9. The log transporter of claim 6 wherein said transfer means comprises a plurality of rigid arms each having an upper end pivotally affixed to said first wall and a lower end bearing against one of said flexible members.

10. The log transporter of claim 9 wherein said receiving deck comprises a plurality of spaced apart transverse members and said flexible members hang in spaces between said transverse members.

11. The log transporter of claim 10 wherein upper surfaces of said transverse members are concave.

12. The log transporter of claim 6 wherein one end of each of said flexible members is connected to said first wall, said flexible members extend over said top portion of said second wall, and a second end of each of said flexible members is connected to a tensioning means.

13. The log transporter of claim 12 wherein said tensioning means comprises a rotatable drum.

14. The log transporter of claim 5 wherein said second deck is a dumping deck.

15. The log transporter of claim 14 wherein said dumping deck comprises a deck member and a lift for lifting said deck member.

16. The log transporter of claim 15 wherein said third wall comprises a plurality of posts mounted to said frame and a plurality of stakes pivotally mounted to said posts at points between ends of said stakes, wherein an outer edge of said deck member is pivotally coupled to one end of each of said stakes.

17. The log transporter of claim 16 wherein an inner edge of said deck member comprises projecting members having end portions slidably engaged in tracks on said second wall.

18. The log transporter of claim 17 wherein said lift comprises a first lift member having one end pivotally connected to said frame, a second lift member having one end pivotally connected to said deck member and a second end pivotally connected to a second end of said first lift member, and an actuator for pivoting said first and second lift members apart.

19. A log transporter comprising:
(a) a vehicle frame;
(b) a receiving deck on said vehicle frame for receiving logs between first and second walls;
(c) a rail extending generally parallel to and higher than said receiving deck, said rail having a portion extending rearwardly of a rearward end of said receiving deck;
(d) a carriage movable along said rail;
(e) a block mounted on said carriage;
(f) a winch coupled to said vehicle frame;
(g) a first cable on said winch, said first cable having a free end extending through said block;
(h) means on said free end of said first cable for detachably affixing said free end of said cable to a log; and
(i) drag means comprising a second cable extending rearwardly from said carriage and connected to a carriage winch for resisting forward movement of said carriage along said rail;
wherein said carriage winch comprises a hydraulic motor having input and output lines and said drag means comprises a flow control valve connectible between said input and output lines.

20. A log transporter comprising:
(a) a vehicle frame;
(b) a receiving deck on said vehicle frame for receiving logs between first and second walls;
(c) a rail extending generally parallel to and higher than said receiving deck, said rail having a portion extending rearwardly of a rearward end of said receiving deck;
(d) a carriage movable along said rail;
(e) a block mounted on said carriage;
(f) a winch coupled to said vehicle frame;
(g) a first cable on said winch, said first cable having a free end extending through said block;
(h) means on said free end of said first cable for detachably affixing said free end of said cable to a log; and
(i) drag means comprising a second cable extending rearwardly from said carriage and connected to a carriage winch for resisting forward movement of said carriage along said rail;
wherein said carriage winch comprises a hydraulic motor having input and output lines and said drag means comprises an orifice connectible between said input and output lines.

21. A method for loading logs onto a receiving deck in a log transporter, said method comprising the steps of:

(a) providing a winch equipped with a cable at a forward end of said receiving deck;
(b) extending said cable through a block mounted to a carriage, said carriage movable longitudinally along a rail mounted above said receiving deck;
(c) moving said carriage to a point behind a rear edge of said receiving deck and attaching a free end of said cable to a log to be loaded;
(d) applying a drag force to said carriage to resist forward motion of said carriage along said rail, said drag force preventing forward motion of said carriage unless a pulling force on said carriage exceeds said drag force;
(e) operating said winch to pull said cable through said block, thereby drawing said log toward said receiving deck lifting a first end of said log toward said block and simultaneously causing said cable to exert a pulling force on said carriage; and
(f) when said first end of said log is higher than said receiving deck, allowing said winch to pull said cable forwardly until said pulling force exceeds said drag force and said carriage moves forwardly along said rail against said drag force while a forward end of said log is suspended by said cable and pulled forwardly by said cable along said receiving deck.

22. The method of claim 21 wherein said drag force is at least 800 pounds.

23. A log transporter comprising:
(a) a vehicle frame;
(b) a receiving deck on said vehicle frame for receiving logs between first and second walls;
(c) a rail extending generally parallel to and higher than said receiving deck, said rail having a portion extending rearwardly of a rearward end of said receiving deck;
(d) a carriage movable along said rail;
(e) a block mounted on said carriage;
(f) a winch on a tow vehicle hitched to said vehicle frame;
(g) a first cable on said winch, said cable having a free end extending through said block;
(h) means on said free end of said cable for detachably affixing said free end of said cable to a log; and
(i) drag means for resisting forward movement of said carriage along said rail;
wherein, when said drag means is applied, said drag means prevents forward movement of said carriage along said rail unless a force in excess of a threshold force is applied to said carriage and said drag means permits forward motion of said carriage along said rail if a forwardly directed force in excess of said threshold force is applied to said carriage and, when said drag means is not applied, said drag means permits forward motion of said carriage along said rail when a forwardly directed force smaller than said threshold force is applied to said carriage.

24. The log transporter of claim 23 wherein said threshold force is approximately 800 pounds or more.

* * * * *